July 6, 1943.  C. W. COCHRAN  2,323,518
SPECTACLE
Filed Nov. 12, 1941

Clarence W. Cochran
INVENTOR.
BY Donald L. Brown
Attorney

Patented July 6, 1943

2,323,518

UNITED STATES PATENT OFFICE 2,323,518

SPECTACLES

Clarence W. Cochran, Arlington, Mass., assignor to Polaroid Corporation, Dover, Del., a corporation of Delaware Application November 12, 1941, Serial No. 418,691

6 Claims. (Cl. 88—41)

This invention relates to spectacles, and more particularly to a frame for spectacles or the like which can be made cheaply and easily from a blank formed from material such as cardboard or paper.

It is one object of the present invention to provide a light and inexpensive spectacle frame which may be formed in one blank stamped out of any suitably strong sheet material such as cardboard or heavy paper.

Another object of the invention is to provide such a frame which is suitable for use with lenses of plastic material.

A further object is to provide such a spectacle frame which is particularly adapted to have combined therewith plastic lenses formed from light-polarizing sheet materials and which may accordingly be used for viewing three-dimensional pictures projected by means of polarized light.

A still further object is to provide such a spectacle frame in the form of a single blank suitably cut and scored in such manner that it may be unfolded to provide integrally formed temples.

Figure 1:
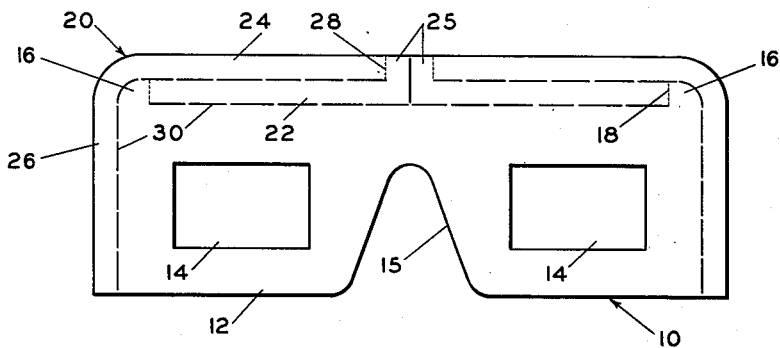
Figure 2:
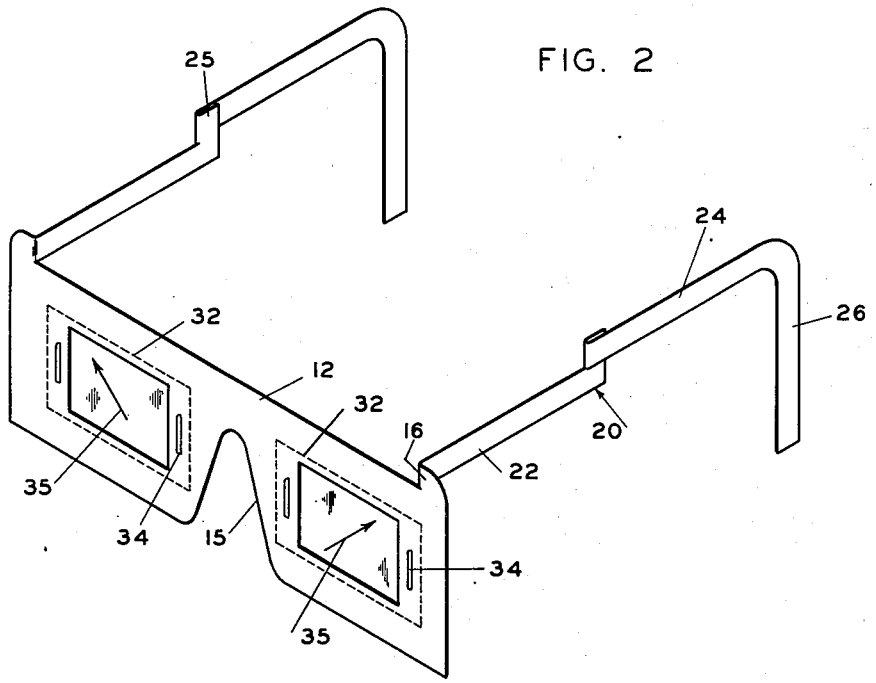

Other objects and advantages will in part be apparent and in part be pointed out in the course of the following description of one embodiment of the invention, which is given as a non-limiting example, in connection with the accompanying drawing, in which:

Figure 1 is a view in elevation showing a blank made from material such as paper or cardboard, and from which spectacles embodying a form of the invention may be made; and Figure 2 is a view in perspective showing a pair of spectacles such as may be made from the blank shown in Fig. 1, and having lenses of light-polarizing material incorporated therein.

There has been in recent years a rapid growth in popularity of three-dimensional pictures, and particularly in three-dimensional pictures produced by means of polarized light. It is necessary that a person viewing such pictures be provided with a suitable viewing device having light-polarizing lenses or viewing windows which will enable each eye to see only the proper one of the two images of the stereoscopic pair forming the three-dimensional picture. Heretofore, such viewing devices have commonly been provided in the form of a light cardboard frame having light-polarizing windows mounted therein, and since such devices are commonly used for a relatively limited period, they have been generally satisfactory. The main disadvantage of such viewers is that they are not provided with temples or any other supporting means but must be held by the hand of the user. The present invention is directed to the provision of an inexpensive viewer which will be free from this disadvantage.

In Fig. 1, blank 10 may be made as by die-cutting or stamping in a single operation from any suitable stiff sheet material such as cardboard, heavy paper, or a plastic of similar physical properties. Frame portion 12 of blank 10 is provided with a pair of eye apertures 14 and a cut-out portion 15 to accommodate the nose of the wearer. In its upper corners frame 12 is formed with a pair of ears or tabs 16, each of which is separated along its inner edge by means of a scored fold line 18 from one of temples 20.

It will be seen that each of temples 20 comprises a pair of segments 22 and 24 connected by an integrally formed tab 25. Segment 24 is made approximately L-shaped in outline to provide an ear-engaging portion 26. Another fold line 28 may be provided between tab 25 and one of said segments, for example segment 24, in order to permit unfolding of the temple in the manner shown in Fig. 2. Temples 20 are preferably formed integrally with frame portion 12 during the initial operation of cutting blank 10, but are either cut or otherwise separated from frame 12 along dash lines 30 or the blank may be heavily scored along lines 30 or otherwise similarly treated so that the temples may later be easily separated from the frame and unfolded in the manner shown in Fig. 2.

Fig. 2 shows a completed pair of spectacles formed from the blank shown in Fig. 1, and said spectacles are assumed to be adapted for use in viewing stereoscopic images projected by means of polarized light vibrating at angles of substantially 45° to the horizontal, which is the preferred case. It will be seen that there has been added to frame 12 a pair of windows 32, one of which is mounted over each of eye apertures 14 by any suitable means such as adhesive or staples 34. In Fig. 2, windows 32 are represented as comprising light-polarizing material, such for example as one of the light-polarizing materials sold under the trade name "Polaroid." The axes of windows 32 are represented by arrows 35, and it will be noted that said arrows are shown as substantially at right angles to each other and at angles of substantially 45° to the line connecting the centers of apertures 14. It is to be understood, however, that the invention is not limited to the use of any particular material in the viewing windows or any particular arrangement thereof.

It will be seen that the viewer of this invention has numerous advantages over those heretofore commonly used. It is much more convenient for the user than the type of viewer which is held in the hand. The cost of manufacture is no greater, since the entire frame blank 10 may conveniently be formed in one die-cutting or similar operation, and a series of blanks may be cut from contiguous areas in the same sheet. Furthermore, it requires only just sufficient additional material to form the temples, and there is no more material wasted than in forming the previous type of viewer. Since viewers of this type are commonly given away for one-time use and as advertising, all of these advantageous features of low cost and convenience are important.

It will be understood that many modifications of the above described embodiment of the invention may be made without departing from the scope of the invention. For example, the fold line indicated by dotted lines 28 may be placed between tab 25 and segment 22 instead of between tab 25 and segment 24 without in any way altering the operation of the device, or the outline of frame 12 may be changed to conform with any other desired design. Moreover, it is not essential that the polarizing material in windows 32 be arranged as described. For example, one window may have its axis vertical and the other horizontal, for viewing three-dimensional pictures projected by means of vertically and horizontally vibrating polarized light. Alternatively, frame 10 may be used for inexpensive sunglasses, in which case each of polarizing windows 32 should have their axes so arranged that they transmit only vertically vibrating light. In another modification of the invention the viewer may be adapted for viewing three-dimensional pictures of the type known as anaglyphs, wherein each image of a stereoscopic pair is projected by means of differently colored light, for example red and blue, and in this modification each of the windows 32 will be made of correspondingly differently colored plastic material such as regenerated cellulose. Other modifications will doubtless be apparent to those skilled in the art, and are to be construed as coming within the scope of the invention and of the claims herein.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. An ophthalmic mounting comprising a substantially rectangular, integral blank of sheet material, a portion of said blank defining a spectacle frame and being provided with eye and nose apertures, the remainder of said blank defining temples, each of said temples comprising a plurality of segments, one of said segments comprising the ear-engaging temple portion and forming a portion of the top of said blank, the other of said segments lying in parallel relation with said first-named segment, and means providing fold lines between said segments and between said second-named segment and said frame portion whereby said temples may be unfolded and extended for use.

2. An ophthalmic mounting comprising a substantially rectangular, integral blank of sheet material, a portion of said blank defining a spectacle frame and being provided with eye and nose apertures, the remainder of said blank defining temples, each of said temples comprising a plurality of segments, one of said segments being substantially L-shaped in outline and comprising the ear-engaging temple portion, said segment forming the end and a portion of the top of said blank, the other of said segments lying in parallel relation with said top-forming portion of said first-named segment, and means providing substantially vertical fold lines between said segments and between said second-named segment and said frame portion whereby said temples may be unfolded and extended for use.

3. An ophthalmic mounting comprising a substantially rectangular, integral blank of sheet material, a portion of said blank defining a spectacle frame and being provided with eye and nose apertures, the remainder of said blank defining temples, each of said temples comprising a plurality of segments, one of said segments being substantially L-shaped in outline and comprising the ear-engaging temple portion, said segment forming the end and a portion of the top of said blank, the other of said segments lying in parallel relation with said top-forming portion of said first-named segment, a top portion former integrally with both of said segments at one end thereof and positioned adjacent the midpoint of the top of said blank, means providing a substantially vertical fold line between said top portion and one of said segments, and means providing a substantially vertical fold line between the other end of said second-named segment and said frame portion.

4. An ophthalmic mounting comprising a substantially rectangular, integral blank of sheet material, a portion of said blank defining a spectacle frame and being provided with eye and nose apertures, the remainder of said blank defining temples, each of said temples comprising a plurality of segments, one of said segments being substantially L-shaped in outline and comprising the ear-engaging temple portion, said segment forming the end and a portion of the top of said blank, the other of said segments lying in parallel relation with said top-forming portion of said first-named segment, a top portion formed integrally with both of said segments at one end thereof and positioned adjacent the midpoint of the top of said blank, means providing a substantially vertical fold line between said top portion and one of said segments, said frame portion having an upwardly extending tab portion at each of its upper corners, said second-named segment being integrally connected at its other end to the inner edge of one of said tab portions, and means providing a substantially vertical fold line between said tab portion and said segment.

5. An ophthalmic mounting comprising a substantially rectangular, integral blank of sheet material, a portion of said blank defining a spectacle frame and being provided with eye and nose apertures, a sheet of light-polarizing material positioned over each of said apertures and secured to said frame, the remainder of said blank defining temples, each of said temples comprising a plurality of segments, one of said segments being substantially L-shaped in outline and comprising the ear-engaging temple portion, said segment forming the end and a portion of the top of said blank, the other of said segments lying in parallel relation with said top-forming portion of said first-named segment, and means providing substantially vertical fold lines between said segments and between said second-named segment and said frame portion whereby said temples may be unfolded and extended for use.

6. An ophthalmic mounting comprising a substantially rectangular, integral blank of sheet material, a portion of said blank defining a spectacle frame and being provided with eye and nose apertures, a sheet of light-polarizing material positioned over each of said apertures and secured to said frame, the polarizing axes of said sheets being substantially at right angles to each other, the remainder of said blank defining temples, each of said temples comprising a plurality of segments, one of said segments being substantially L-shaped in outline and comprising the ear-engaging temple portion, said segment forming the end and a portion of the top of said blank, the other of said segments lying in parallel relation with said top-forming portion of said first-named segment, and means providing substantially vertical fold lines between said segments and between said second-named segment and said frame portion whereby said temples may be unfolded and extended for use.

CLARENCE W. COCHRAN.

CERTIFICATE OF CORRECTION.

Patent No. 2,323,518.   July 6, 1943.

CLARENCE W. COCHRAN.

It is hereby certified that error appears in the printed specification of the above numbered patent requiring correction as follows: Page 2, second column, line 30, claim 3, for "former" read --formed--; and that the said Letters Patent should be read with this correction therein that the same may conform to the record of the case in the Patent Office.

Signed and sealed this 14th day of December, A. D. 1943.

Henry Van Arsdale,
Acting Commissioner of Patents.